(12) United States Patent
Dai et al.

(10) Patent No.: US 11,958,934 B1
(45) Date of Patent: Apr. 16, 2024

(54) WATERBORNE POLYURETHANE (WPU) EMULSION AND PREPARATION METHOD THEREFOR

(71) Applicant: Shimu Special Protective Equipment Technology (Jiangsu) Co., Ltd., Yancheng (CN)

(72) Inventors: Guoda Dai, Yancheng (CN); Wei Wen, Yancheng (CN)

(73) Assignee: Shimu Special Protective Equipment Technology (Jiangsu) Co., Ltd., Yancheng (CN)

( * ) Notice: Subject to any disclaimer, the term of this patent is extended or adjusted under 35 U.S.C. 154(b) by 0 days.

(21) Appl. No.: 18/110,586

(22) Filed: Feb. 16, 2023

(30) Foreign Application Priority Data

Sep. 30, 2022 (CN) .......................... 202211211903.5

(51) Int. Cl.
| | | |
|---|---|---|
| *C08G 18/48* | (2006.01) | |
| *C08G 18/10* | (2006.01) | |
| *C08G 18/24* | (2006.01) | |
| *C08K 5/00* | (2006.01) | |
| *C08K 5/06* | (2006.01) | |
| *C08K 5/09* | (2006.01) | |
| *C08K 5/17* | (2006.01) | |
| *C08K 5/24* | (2006.01) | |
| *C08K 5/5415* | (2006.01) | |
| *C08L 1/28* | (2006.01) | |
| *C09D 7/20* | (2018.01) | |
| *C09D 7/43* | (2018.01) | |
| *C09D 175/08* | (2006.01) | |

(52) U.S. Cl.
CPC ......... *C08G 18/4854* (2013.01); *C08G 18/10* (2013.01); *C08G 18/246* (2013.01); *C08K 5/06* (2013.01); *C08K 5/09* (2013.01); *C08K 5/17* (2013.01); *C08K 5/24* (2013.01); *C08K 5/5415* (2013.01); *C08L 1/286* (2013.01); *C09D 7/20* (2018.01); *C09D 7/43* (2018.01); *C09D 175/08* (2013.01); *C08G 2150/00* (2013.01)

(58) Field of Classification Search
CPC .. C08G 18/4854; C08G 18/246; C08G 18/10; C09D 7/20; C09D 7/43; C09D 175/08; C08K 5/06; C08K 5/09; C08K 5/17; C08K 5/24; C08K 5/5415
See application file for complete search history.

(56) References Cited

U.S. PATENT DOCUMENTS 6,322,851 B1 * 11/2001 Adachi ................ D06N 3/0004
427/419.7

FOREIGN PATENT DOCUMENTS

| CN | 104193948 A | * 12/2014 | ......... C08G 18/3206 |
| CN | 110452351 A | * 11/2019 | ......... A41D 19/0062 |
| JP | 2000351805 A | * 12/2000 | ................ C08F 2/24 |
| JP | 2002061079 A | * 2/2002 | |

OTHER PUBLICATIONS

CN-104193948-A_Dec. 2014_English.*
CN-110452351-A_Nov. 2019_English.*
JP-2002061079-A_Feb. 2002_English.*
JP-2000351805-A_Dec. 2000_Engish.*

* cited by examiner

*Primary Examiner* — Michael L Leonard
(74) *Attorney, Agent, or Firm* — Fish IP Law, LLP

(57) ABSTRACT

The present disclosure provides a waterborne polyurethane (WPU) emulsion and a preparation method therefor, and relates to the technical field of glove processing. The WPU emulsion of the present disclosure is prepared from polyol, isocyanate, a hydrophilic chain extender, a diluent, a neutralizer, a post chain extender, water, a catalyst, a cellulose thickener, a wetting agent, and a dispersant. The WPU emulsion of the present disclosure is used to dip knitted gloves, which can improve abrasion resistance and flexibility of the gloves, prolong service life of the gloves, and improve wearing comfort of the gloves.

12 Claims, No Drawings

WATERBORNE POLYURETHANE (WPU) EMULSION AND PREPARATION METHOD THEREFOR

CROSS REFERENCE TO RELATED APPLICATION

This patent application claims the benefit and priority of Chinese Patent Application No. 202211211903.5, filed with the China National Intellectual Property Administration on Sep. 30, 2022, the disclosure of which is incorporated by reference herein in its entirety as part of the present application.

TECHNICAL FIELD

The present disclosure relates to the technical field of glove processing, and in particular, to a waterborne polyurethane (WPU) emulsion and a preparation method therefor.

BACKGROUND

Dipped gloves, also known as latex gloves, are one of the gloves. Different from ordinary gloves, the dipped gloves are made of latex. The dipped gloves are comfortable to wear after special surface treatment, and are necessary hand protection products. that have been widely used in industrial and agricultural production, medical treatment, beauty treatment and daily life.

Because the rubber used in the traditional production of dipped gloves is of a solvent type, a large number of chemical auxiliary materials that are easy to volatilize are used in the production process. Due to the high temperature in the workshop and the unsealed production line, the rubber pool is constantly stirred by the hand model, such that the chemical substances are very easy to volatilize into the air of the workshop, which has a serious impact on the health of the production workers, such as in the solvent-based knitting glove glue workshop. Benzene, methanol, and acetic acid have short-term exposure concentrations of 404.1 mg/m$^3$, 186.5 mg/m$^3$, and 45.5 mg/m$^3$ respectively and time weighted average exposure concentrations of 212.2 mg/m$^3$, 76.4 mg/m$^3$, and 29.2 mg/m$^3$ respectively. In order to reduce the physical injury to workers, most factories use transparent plastic sheets to encapsulate the production line, which greatly reduces the concentration of chemical substances in the workshop, but does not fundamentally solve the problem of organic volatile pollution. In addition, at least 40% of the organic solvents in the rubber are directly discharged into the air without treatment throughout the production process, causing serious environmental pollution.

With the improvement of the green safety standards for labor protection appliances in Europe and the United States, the rubber used for labor protection gloves, mainly for export, is gradually transferred to waterborne materials, most commonly latex gloves (i.e., natural rubber latex (NRL) gloves) and nitrile gloves. However, the NRL gloves themselves contain proteins that can cause skin allergies. Besides, although the nitrile gloves contain no protein and will not cause allergies to wearers, oligomers or part of monomers contained in nitrile latex are difficult to completely polymerize in the process of hot vulcanization, which is likely to cause odor and secondary pollution. In recent years, with the development of science and technology and the improvement of product quality requirements, the new products of high-performance WPU adhesives have attracted extensive attention immediately after they are introduced to the overseas market. The WPU with water as a dispersion medium is non toxic, environmentally friendly, uninflammable, safe and reliable, not easy to damage the coated surface, energy saving, easy to operate, and easy to modify, and also has good solvent resistance, abrasion resistance, flexibility, and thermal stability, such that it is widely applied in leather finishing, fabrics, adhesives, and coatings.

As a high-performance environment-friendly material, the WPU has superior comprehensive performance and strong designability of molecular structure. With the continuous improvement of preparation technology, the WPU has surpassed other waterborne polymers in film formation, aging resistance, friction resistance, and strength. In terms of air permeability, flexibility, and hand feel, the WPU has incomparable advantages over other waterborne materials, and is the preferred material for manufacturing high-performance labor protection glue gloves. In this present disclosure, through modification of WPU prepolymer long chain siloxane, in-situ inorganic hybridization of prepolymer phase, and acrylic acid polymerization grafting, the core technical problems of low solid content, low curing speed, poor water resistance, and low initial viscosity of the WPU material for fabric core glue gloves are solved. Foreign technology monopoly is broken through and surpassed. Environment-friendly production is realized. High value-added properties such as environmental protection, air permeability, waterproofness, high elasticity, hand feeling, and water resistance of the glue gloves are improved.

SUMMARY

In view of this, an objective of the present disclosure is to provide a WPU emulsion, which is prepared by adding a cellulose thickener at an emulsification stage to form a hydrogen bond between the cellulose thickener and water molecules at an initial stage of formation of polyurethane particles, so as to limit movement of the water molecules and make the particles collide and combine, thereby improving the abrasion resistance and flexibility, and prolonging the life of dipped gloves.

The WPU emulsion provided by the present disclosure includes the following raw materials in part by weight:

230-250 parts of polyol, 50-60 parts of isocyanate, 5-10 parts of a hydrophilic chain extender, 60-80 parts of a diluent, 5-9 parts of a neutralizer, 500-600 parts of water, 15-20 parts of a post chain extender, 0.01-0.05 parts of a catalyst, 3-7 parts of a cellulose thickener, 0.5-1.5 parts of a wetting agent, and 3-5 parts of a dispersant.

Preferably, the polyol is one or more selected from the group consisting of polyester polyols, polyether polyols, polycaprolactone polyols, polycarbonate polyols, polysiloxane polyols, and polytetrahydrofuran (PTHF).

Preferably, the isocyanate is one or two selected from the group consisting of isophorone diisocyanate (IPDI) and hexamethylene diisocyanate (HDI).

Preferably, the hydrophilic chain extender is 2,2-dimethylol propionic acid (DMPA).

Preferably, the diluent is any one selected from the group consisting of dimethylacetamide (DMAC), acetone, N,N-dimethylformamide (DMF), and N-methylpyrrolidone (NMP).

Preferably, the neutralizer is triethylamine (TEAM).

Preferably, the post chain extender is one or two selected from the group consisting of diethylenetriamine, ethylenediamine, isophorone diamine, and hydrazine hydrate.

Preferably, the catalyst is organic tin or organic bismuth. The cellulose thickener is carboxymethyl cellulose. The wetting agent is polyether modified organosiloxane. The dispersant is aryl ethyl phenyl polyethylene glycol ether.

The organic tin used in the present disclosure is dibutyltin dilaurate, which is T12 purchased from Shanghai Huihua Industrial Co., Ltd. The organic bismuth is an organic bismuth catalyst, purchased from BiCAT of Xindian Chemistry Materials (Shanghai) Co., Ltd. The cellulose thickener is carboxymethyl cellulose, purchased from CMC of Weifang Lude Chemical Co., Ltd. The wetting agent is polyether modified organosiloxane, purchased from BYK348 of BYK Chemical. The dispersant is aryl ethyl phenyl polyethylene glycol ether, the model of which is Lucramul RL of H.J.Unkel (Shanghai) International Trading Co., Ltd.

Another objective of the present disclosure is to provide a preparation method for the WPU emulsion, including the following steps:

Step I: Preparation of Isocyanate Terminated Prepolymer
putting the polyol and the hydrophilic chain extender into a reactor, adding the isocyanate while stirring at 150-200 r/min, adding the catalyst after a temperature rises to 75-85° C., introducing nitrogen, and conducting heat preservation for 3 h to obtain the isocyanate terminated prepolymer;

Step II: Neutralization
when the temperature in the reactor is reduced to be no more than 60° C., adding the diluent and the neutralizer to neutralize the isocyanate terminated prepolymer to obtain a neutralized prepolymer;

Step III: Emulsification
at 20° C., adding the neutralized prepolymer in step II into the water to obtain a mixture, and stirring the mixture at 3,000-3,500 r/min for 30 min to form a dispersion;

Step IV: Post Chain Extension
at 450-500 r/min, adding the post chain extender to the dispersion in step III, and stirring for 30 min to obtain a WPU dispersion, where a particle size is limited to 20-30 μm during chain extension; and Step V: Preparation of Emulsion
adding the cellulose thickener, the wetting agent, and the dispersant into the WPU dispersion, and stirring for 30 min to obtain the WPU emulsion.

A method for dipping knitted gloves with the WPU emulsion includes the following specific steps:

a, slurry spraying: sleeving a knitted glove lining on an assembly line mold, heating to 30-60° C., spraying a first layer of the WPU emulsion on a surface of the knitted glove lining using a slurry spraying mode, initially curing for 10-20 min at 50-90° C., and fully curing for 10-20 min at 100-130° C. to obtain a layer of dipped gloves;

b, dipping: cooling the layer of dipped gloves fully cured in step a to 30-60° C., coating a surface of the layer of dipped gloves with second to fourth layers of the WPU emulsion using a dipping mode, and fully curing for 10-20 min at 90-110° C. to obtain rough gloves; and c, demoulding: cooling the rough gloves obtained after dipping above to 30-60° C., coating a surface with the WPU emulsion by spraying or dipping, initially curing for 2-10 min at 50-90° C., fully curing for 10-20 min at 100-130° C., and cooling and demoulding.

The present disclosure has the following beneficial effects over the prior art:

The present disclosure provides a WPU emulsion and a preparation method therefor. The WPU emulsion is prepared by adjusting the raw materials, defining the particle size in the composition, and adding the cellulose thickener at the emulsification stage to form a hydrogen bond between the cellulose thickener and water molecules at an initial stage of formation of polyurethane particles, so as to limit movement of the water molecules and make the particles collide and combine. The dipped gloves prepared with the above emulsion are perfectly combined with the fabric glove core, which has the characteristics of more excellent abrasion resistance and flexibility and long service life, and achieves more excellent wearing comfort than simple knitted gloves. Moreover, the dipped gloves prepared by the present disclosure have simple preparation process, short production cycle, high production capacity, and high cost-effectiveness.

DETAILED DESCRIPTION OF THE EMBODIMENTS

The present disclosure is further described below with reference to examples.

Example 1

A WPU emulsion included the following raw materials in part by weight: 270.74 parts of polyol, 50.56 parts of isocyanate, 7.82 parts of a hydrophilic chain extender, 36 parts of a diluent, 5.9 parts of a neutralizer, 541.66 parts of water, 17.21 parts of a post chain extender, 0.02 parts of a catalyst, 3.6 parts of a cellulose thickener, 2.2 parts of a wetting agent, and 1.8 parts of a dispersant.

The polyol was PTHF 1000. The isocyanate consisted of 25.56 parts of IPDI and 25 parts of HDI. The hydrophilic chain extender was 2,2-dimethylol propionic acid DMPA. The diluent was acetone. The neutralizer was TEAM. The post chain extender was hydrazine hydrate. The catalyst was dibutyltin dilaurate. The cellulose thickener was carboxymethyl cellulose. The wetting agent was polyether modified organosiloxane. The dispersant was aryl ethyl phenyl polyethylene glycol ether.

A preparation method for the WPU emulsion included the following steps.

Step I: Preparation of Isocyanate Terminated Prepolymer
The polyol and the hydrophilic chain extender were put into a reactor, The isocyanate was added while stirring at 150 r/min. The catalyst was added after a temperature rose to 80° C. Nitrogen was introduced. Heat preservation was conducted for 3 h to obtain the isocyanate terminated prepolymer.

Step II: Neutralization
When the temperature in the reactor was reduced to 60° C., the diluent and the neutralizer were added to neutralize the isocyanate terminated prepolymer to obtain a neutralized prepolymer.

Step III: Emulsification
At 20° C., the neutralized prepolymer in step II was added into the water to obtain a mixture, and the mixture was stirred at 3,200 r/min (high speed stirring) for 30 min to form a dispersion.

Step IV: Post Chain Extension
At 500 r/min (low speed stirring), the post chain extender was added to the dispersion in step III, and stirred for 30 min to obtain a WPU dispersion. A particle size was limited to 20-30 μm during chain extension.

Step V: Preparation of Emulsion
The cellulose thickener, the wetting agent, and the dispersant were added into the WPU dispersion, and stirred for 30 min to obtain the WPU emulsion.

A method for preparing dipped gloves with the above WPU emulsion included the following specific steps.

a, Slurry spraying: a knitted glove lining was sleeved on an assembly line mold, and heated to 50° C. A first layer of the WPU emulsion was sprayed on a surface of the knitted glove lining using a slurry spraying mode, initially cured for 15 min at 80° C., and fully cured for 20 min at 120° C. to obtain a layer of dipped gloves.

b, Dipping: the layer of dipped gloves fully cured in step a was cooled to 35° C. A surface of the layer of dipped gloves was coated with second to fourth layers of the WPU emulsion using a dipping mode. Each layer of the emulsion was fully cured for 20 min at 100° C. to obtain rough gloves.

c, Demoulding: the rough gloves obtained after dipping above was cooled to 35° C. A surface was coated with the polyurethane particles by spraying or dipping, initially cured for 10 min at 60° C., fully cured for 20 min at 120° C., and cooled and demoulded.

The above descriptions are merely preferred implementations of the present disclosure. It should be noted that those of ordinary skill in the art may further make several improvements and modifications without departing from the principle of the present disclosure, but such improvements and modifications should be deemed as falling within the protection scope of the present disclosure.

What is claimed is:

1. A method of preparing a waterborne polyurethane (WPU) emulsion, the WPU emulsion comprising the following raw materials in part by weight: 230-250 parts of polyol, 50-60 parts of isocyanate, 5-10 parts of a hydrophilic chain extender, 60-80 parts of a diluent, 5-9 parts of a neutralizer, 500-600 parts of water, 15-20 parts of a post chain extender, 0.01-0.05 parts of a catalyst, 3-7 parts of a cellulose thickener, 0.5-1.5 parts of a wetting agent, and 3-5 parts of a dispersant; and the method comprising the following steps:

step I: preparation of isocyanate terminated prepolymer
   adding the polyol and the hydrophilic chain extender into a reactor, adding the isocyanate while stirring at 150-200 r/min, adding the catalyst after a temperature rises to 75-85° C., introducing nitrogen, and conducting heat preservation for 3 h to obtain the isocyanate terminated prepolymer;

step II: neutralization
   when the temperature in the reactor is reduced to be no more than 60° C., adding the diluent and the neutralizer to neutralize the isocyanate terminated prepolymer to obtain a neutralized prepolymer;

step III: emulsification
   at 20° C., adding the neutralized prepolymer in step II into the water to obtain a mixture, and stirring the mixture at 3,000-3,500 r/min for 30 min to form a dispersion;

step IV: post chain extension
   at 450-500 r/min, adding the post chain extender to the dispersion in step III, and stirring for 30 min to obtain a WPU dispersion, wherein a particle size is limited to 20-30 μm during chain extension; and step V: preparation of emulsion
   adding the cellulose thickener, the wetting agent, and the dispersant into the WPU dispersion, and stirring for 30 min to obtain the WPU emulsion.

2. The method according to claim 1, wherein the polyol is one or more selected from the group consisting of polyester polyols, polyether polyols, polycaprolactone polyols, polycarbonate polyols, polysiloxane polyols, and polytetrahydrofuran (PTHF).

3. The method according to claim 1, wherein the isocyanate is one or two selected from the group consisting of isophorone diisocyanate (IPDI) and hexamethylene diisocyanate (HDI).

4. The method according to claim 1, wherein the hydrophilic chain extender is 2,2-dimethylol propionic acid (DMPA).

5. The method according to claim 1, wherein the diluent is any one selected from the group consisting of dimethylacetamide (DMAC), acetone, N,N-dimethylformamide (DMF), and N-methylpyrrolidone (NMP).

6. The method according to claim 1, wherein the neutralizer is triethylamine (TEAM).

7. The method according to claim 1, wherein the post chain extender is one or two selected from the group consisting of diethylenetriamine, ethylenediamine, isophorone diamine, and hydrazine hydrate.

8. The method according to claim 1, wherein the catalyst is organic tin or organic bismuth; the cellulose thickener is carboxymethyl cellulose; the wetting agent is polyether modified organosiloxane; and the dispersant is aryl ethyl phenyl polyethylene glycol ether.

9. A method for dipping knitted gloves with a waterborne polyurethane (WPU) emulsion, the WPU emulsion comprising the following raw materials in part by weight: 230-250 parts of polyol, 50-60 parts of isocyanate, 5-10 parts of a hydrophilic chain extender, 60-80 parts of a diluent, 5-9 parts of a neutralizer, 500-600 parts of water, 15-20 parts of a post chain extender, 0.01-0.05 parts of a catalyst, 3-7 parts of a cellulose thickener, 0.5-1.5 parts of a wetting agent, and 3-5 parts of a dispersant; and the method comprising the following steps:

a, slurry spraying: sleeving a knitted glove lining on an assembly line mold, heating to 30-60° C., spraying a first layer of the WPU emulsion on a surface of the knitted glove lining using a slurry spraying mode, initially curing for 10-20 min at 50-90° C., and fully curing for 10-20 min at 100-130° C. to obtain a layer of dipped gloves;

b, dipping: cooling the layer of dipped gloves fully cured in step a to 30-60° C., coating a surface of the layer of dipped gloves with second to fourth layers of the WPU emulsion using a dipping mode, and fully curing for 10-20 min at 90-110° C. to obtain rough gloves; and c, demoulding: cooling the rough gloves obtained after dipping above to 30-60° C., coating a surface with the WPU emulsion by spraying or dipping, initially curing for 2-10 min at 50-90° C., fully curing for 10-20 min at 100-130° C., and cooling and demoulding.

10. The method for dipping knitted gloves with the WPU emulsion according to claim 9, wherein the polyol is one or more selected from the group consisting of polyester polyols, polyether polyols, polycaprolactone polyols, polycarbonate polyols, polysiloxane polyols, and polytetrahydrofuran (PTHF).

11. The method for dipping knitted gloves with the WPU emulsion according to claim 9, wherein the isocyanate is one or two selected from the group consisting of isophorone diisocyanate (IPDI) and hexamethylene diisocyanate (HDI).

12. The method for dipping knitted gloves with the WPU emulsion according to claim 9, wherein the hydrophilic chain extender is 2,2-dimethylol propionic acid (DMPA).

* * * * *